(12) United States Patent
Jung et al.

(10) Patent No.: US 8,894,093 B2
(45) Date of Patent: Nov. 25, 2014

(54) AIRBAG COVER FOR VEHICLE

(71) Applicants: Hyundai Motor Company, Seoul (KR); Kia Motors Corporation, Seoul (KR); Autoliv Development AB, Vargarda (SE)

(72) Inventors: Doo Seob Jung, Gyeonggi-do (KR); Jae Hyung Oh, Gyeonggi-do (KR); Sang Gyu Yoon, Seoul (KR)

(73) Assignees: Hyundai Motor Company, Seoul (KR); Kia Motors Corporation, Seoul (KR); Autoliv Development AB, Vargarda (SE)

( * ) Notice: Subject to any disclaimer, the term of this patent is extended or adjusted under 35 U.S.C. 154(b) by 0 days.

(21) Appl. No.: 13/868,379

(22) Filed: Apr. 23, 2013

(65) Prior Publication Data

US 2013/0277952 A1 Oct. 24, 2013

(30) Foreign Application Priority Data

Apr. 23, 2012 (KR) ........................ 10-2012-0042341

(51) Int. Cl.
*B60R 21/2165* (2011.01)
*B60R 21/215* (2011.01)
*B60R 21/203* (2006.01)
*B29L 31/30* (2006.01)

(52) U.S. Cl.
CPC ........... *B60R 21/2165* (2013.01); *B60R 21/215* (2013.01); *B29L 2031/3038* (2013.01); *B60R 21/21656* (2013.01); *B60R 2021/21543* (2013.01)
USPC ....................................... 280/728.3; 280/731

(58) Field of Classification Search
CPC ............ B60R 21/203; B60R 21/21656; B60R 21/2165; B60R 21/215; B60R 13/005; B60R 2021/21543; B60R 2021/2165; B60R 2021/215; B60R 2021/203; G09F 2007/1882; B29L 2031/3038
USPC .......................... 280/728.3, 731, 728.2, 728.1
See application file for complete search history.

(56) References Cited

U.S. PATENT DOCUMENTS

2011/0210534 A1* 9/2011 Sauer et al. ................. 280/728.2

FOREIGN PATENT DOCUMENTS

| EP | 1495921 A1 | 1/2005 | |
| JP | 2005-104201 A | * 4/2005 | ............. B60R 21/20 |
| JP | 2005104201 A | 4/2005 | |

* cited by examiner

*Primary Examiner* — Keith Frisby
(74) *Attorney, Agent, or Firm* — Edwards Wildman Palmer LLP; Peter F. Corless

(57) ABSTRACT

An airbag cover for a vehicle that includes an airbag cover body that has a tear line to allow the airbag cover body to be torn off when an airbag cushion is deployed, and a bezel ring coupled to the airbag cover body. The airbag cover includes a plurality of separating protrusions having first and second separating protrusions that are formed on the bezel ring to be spaced apart from each other in a circumferential direction of the bezel ring and to be adjacent to each other. In addition, the separating protrusions have third and fourth separating protrusions adjacent to each other at a position facing the first and second separating protrusions. The separating protrusions include first to fourth separating protrusion insertion apertures that are formed within the airbag cover body to allow the first to fourth separating protrusions to be inserted therein.

4 Claims, 6 Drawing Sheets

AIRBAG COVER FOR VEHICLE

BACKGROUND OF THE INVENTION

1. Field of the Invention

The present invention relates to an airbag cover for a vehicle and, more particularly to an airbag cover for a vehicle including a bezel ring on which no separate tear line is formed.

2. Description of the Related Art

Generally, a vehicle is equipped with an airbag system used a safety device, to protect a driver or passenger from impact during a sudden stop or crash while the vehicle is being driven and to minimize the risk of injury to a driver or passenger. Such an airbag system includes an airbag cover installed in a steering wheel or an instrument panel, an airbag module that has an inflator and an airbag cushion, and an electronic control unit (ECU) configured to explode an inflator in response to an impact signal.

Furthermore, due to a trend toward luxury vehicles, more vehicles include an emblem representing various logos attached to an airbag cover mounted on a steering wheel to improve the interior image of the vehicle and to promote a vehicle manufacturer. Further, a bezel ring is mounted on the airbag cover around the emblem to provide a decorative effect. Such a bezel ring is intended to be broken when the airbag cover is torn off due to the deployment of the airbag cushion.

In the related art, a tear line is formed on an inner surface of the bezel ring to allow the airbag cover to be easily torn off. However, when a driver performs a horn function (perhaps repeatedly) by pushing on the airbag cover to transmit a warning sound to a pedestrian or driver in the vicinity of the vehicle, a portion of the bezel ring on which a tear line is formed is relatively thinner than the remaining portion, and the portion with the tear line may be undesirably torn off, regardless of a driver intention.

SUMMARY

Accordingly, the present invention provides an airbag cover for a vehicle, that allows an airbag cover body and a bezel ring to be broken by the deployment of an airbag cushion without forming a separate tear line on the bezel ring.

In addition, the present invention provides an airbag cover for a vehicle, in which a tear line may not be formed on a bezel ring, thus reducing the breakage of the bezel ring even when a driver pushes an upper surface of the airbag cover several times to perform a horn function.

The aspects of the present invention are not limited to the above-mentioned objects, and other objects that are not mentioned can be clearly understood by those skilled in the art based on the following description.

Specifically, the present invention provides an airbag cover for a vehicle that may include an airbag cover body having a tear line to allow the airbag cover body to be torn off when an airbag cushion is deployed, and a bezel ring coupled to the airbag cover body, with a plurality of insertion apertures being formed in the airbag cover body to allow a plurality of protrusions of the bezel ring to be inserted therein. The airbag cover may include a plurality of separating protrusions including first and second separating protrusions that may be formed on the bezel ring spaced apart from each other in a circumferential direction of the bezel ring and adjacent to each other, and third and fourth separating protrusions that are adjacent to each other at a position facing the first and second separating protrusions; and first to fourth separating-protrusion insertion apertures formed in the airbag cover body to allow the first to fourth separating protrusions to be inserted therein, wherein, when the bezel ring is coupled to the airbag cover body, the first and second separating protrusions are adjacent to the tear line on opposite sides of a first portion of the tear line, and the third and fourth separating protrusions are adjacent to the tear line on opposite sides of a second portion of the tear line.

In particular, a body of the bezel ring having the plurality of protrusions protruding therefrom may have the same thickness in a circumferential direction and a radial direction thereof. The tear line may include a pair of first tear lines disposed in a longitudinal direction of the airbag cover body spaced apart from each other, and a pair of second tear lines provided in a transverse direction of the airbag cover body to connect the pair of first tear lines to each other, and the first and second separating-protrusion insertion apertures may be adjacent to the second tear lines on opposite sides of a first portion of the second tear lines, and the third and fourth separating-protrusion insertion apertures may be adjacent to the second tear lines on opposite sides of a second portion of the second tear lines.

Each of the first to fourth separating protrusions and each of the first to fourth separating-protrusion insertion apertures may have a semi-circular or a semi-elliptical shape. Each of the second tear lines may be a groove having a V-shaped cross-section, and each of a distance between the first and second separating protrusions and a distance between the third and fourth separating protrusions may be equal to a width between the tops of the second tear lines.

The airbag cover may further include a guide pin that protrudes from a surface of a body of the bezel ring, and a guide-pin insertion slot formed in the airbag cover body to allow the guide pin to be inserted therein. Two guide pins and two guide-pin insertion slots may be provided, respectively, and the two guide-pin insertion slots may be formed to communicate with the first to fourth separating-protrusion insertion apertures and may have an asymmetric structure in a horizontal direction with respect to a longitudinal central line of the airbag cover body.

In particular, the two guide pins may include a first guide pin that connects the first or second separating protrusion located at a relatively upper position to a protrusion located above an associated first or second separating protrusion to be spaced apart therefrom, and a second guide pin that connects the third or fourth separating protrusion located at a relatively lower position to a protrusion located below an associated third or fourth separating protrusion to be spaced apart therefrom.

The airbag cover for the vehicle according to an embodiment of the present invention has the following effects.

First, the airbag cover for the vehicle allows the airbag cover body and the bezel ring to be easily broken by the deployment of the airbag cushion without forming the separate tear line on the bezel ring.

Second, the airbag cover for the vehicle may not form a tear line on the bezel ring, thus reducing the breakage of the bezel ring, regardless of the driver intention, even when the driver pushes the upper surface of the airbag cover repeatedly to perform the horn function. In addition, the durability of the bezel ring may be improved.

The effects of the present invention are not limited to the above-mentioned effects, and other effects that are not mentioned can be clearly understood by those skilled in the art based on the following description.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
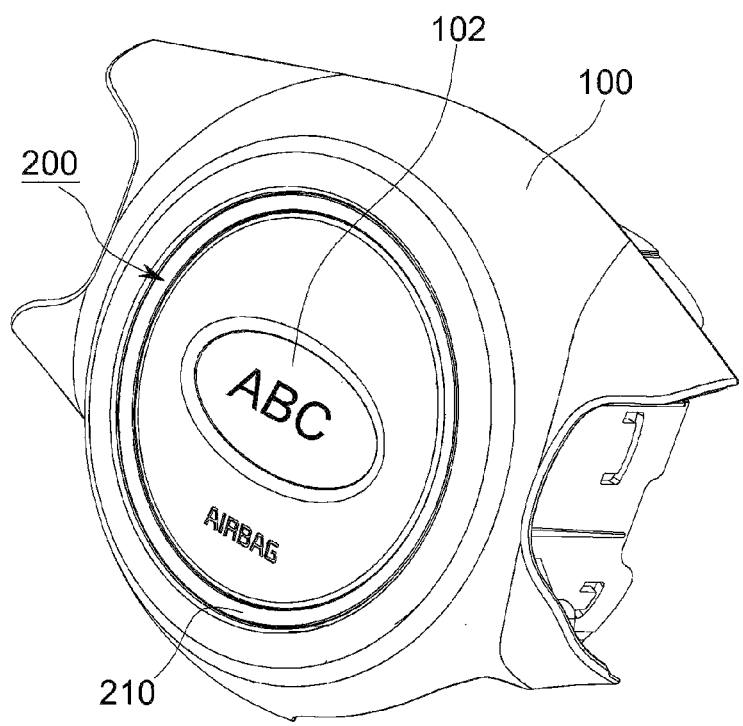
FIG. 1 is an exemplary front view showing an airbag cover for a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, the embodiment of the present invention will be described in more detail with reference to the accompanying drawings. However, the present invention is not limited to the embodiment that will be described below, but may be implemented in various forms. The present exemplary embodiments are provided to merely make the disclosure of this invention complete, and to completely teach the scope of this invention to those skilled in the art. The same reference numerals of the drawings will designate the same elements.

Figure 2:
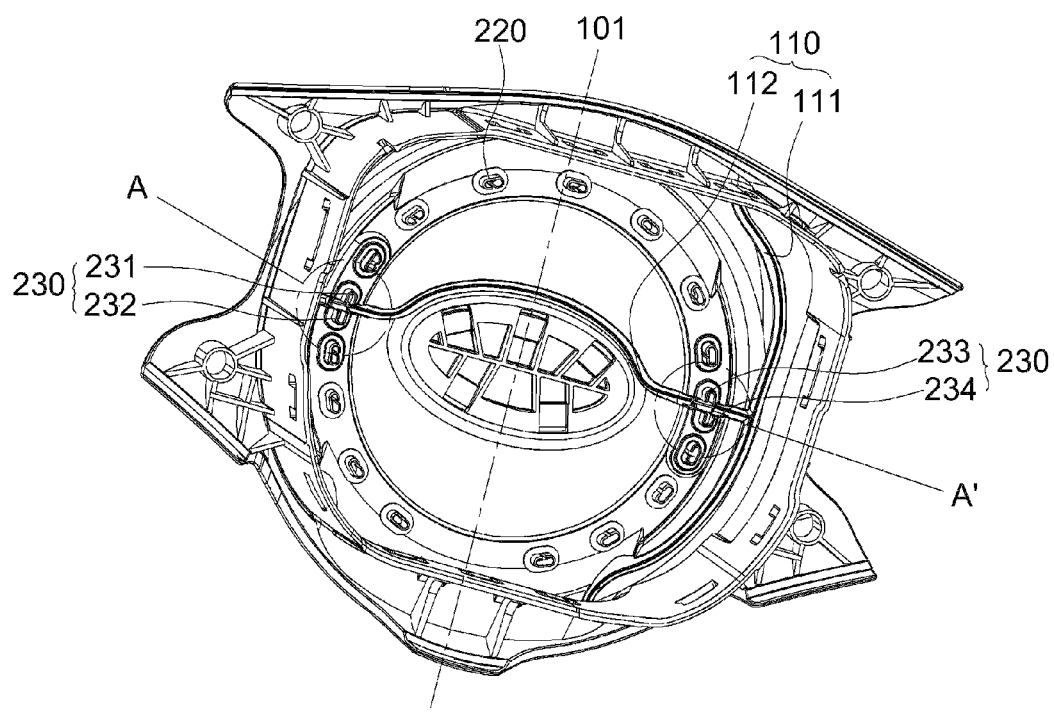
FIG. 2 is an exemplary rear view of FIG. 1 according to an exemplary embodiment of the present invention.
Figure 3:
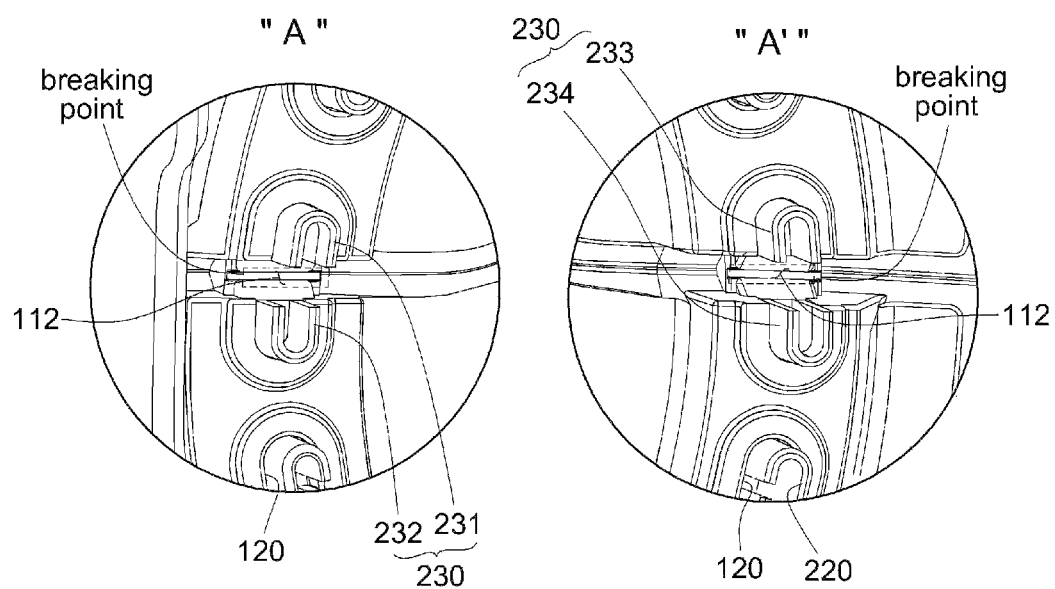
FIG. 3 is an exemplary detailed view showing portions A and A' of FIG. 2 according to an exemplary embodiment of the present invention.
Figure 4:
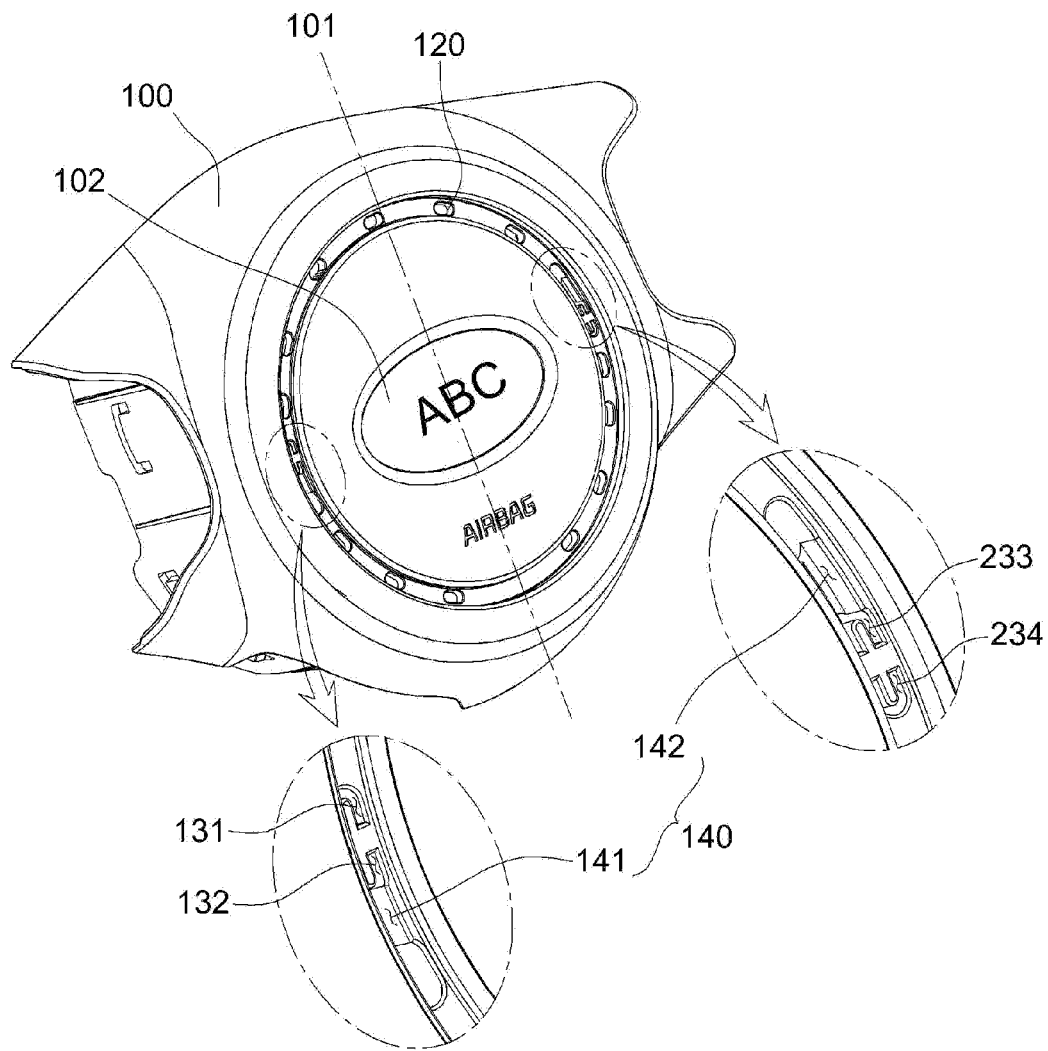
FIG. 4 is an exemplary front view showing an airbag cover body in the airbag cover for the vehicle according to an exemplary embodiment of the present invention.
Figure 5:
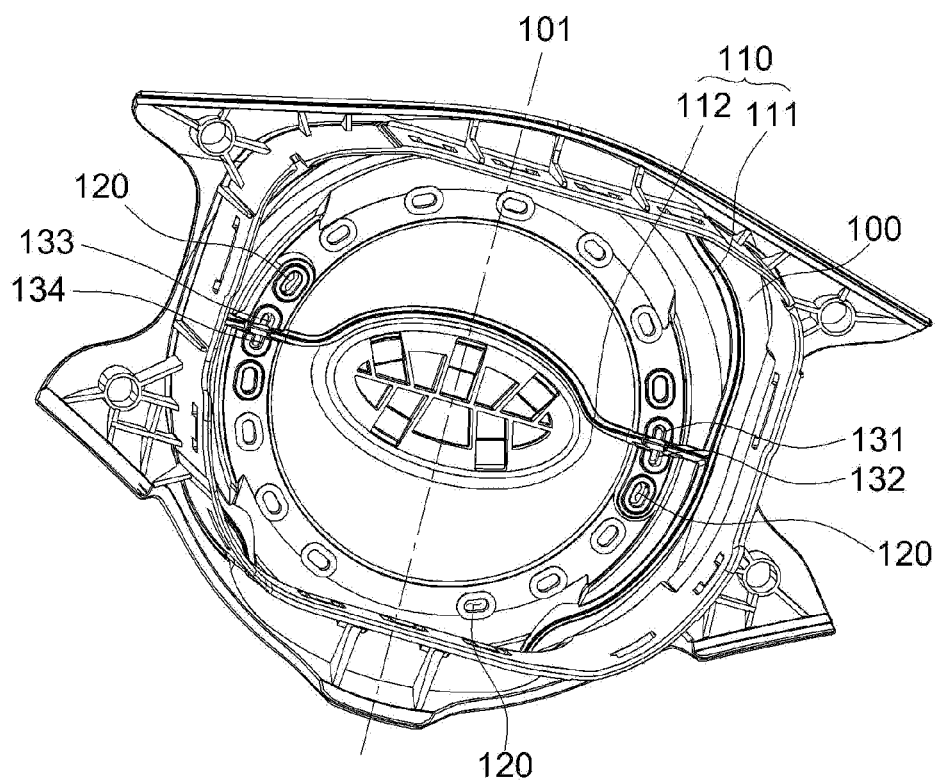
FIG. 5 is an exemplary rear view of FIG. 4 according to an exemplary embodiment of the present invention.
Figure 6:
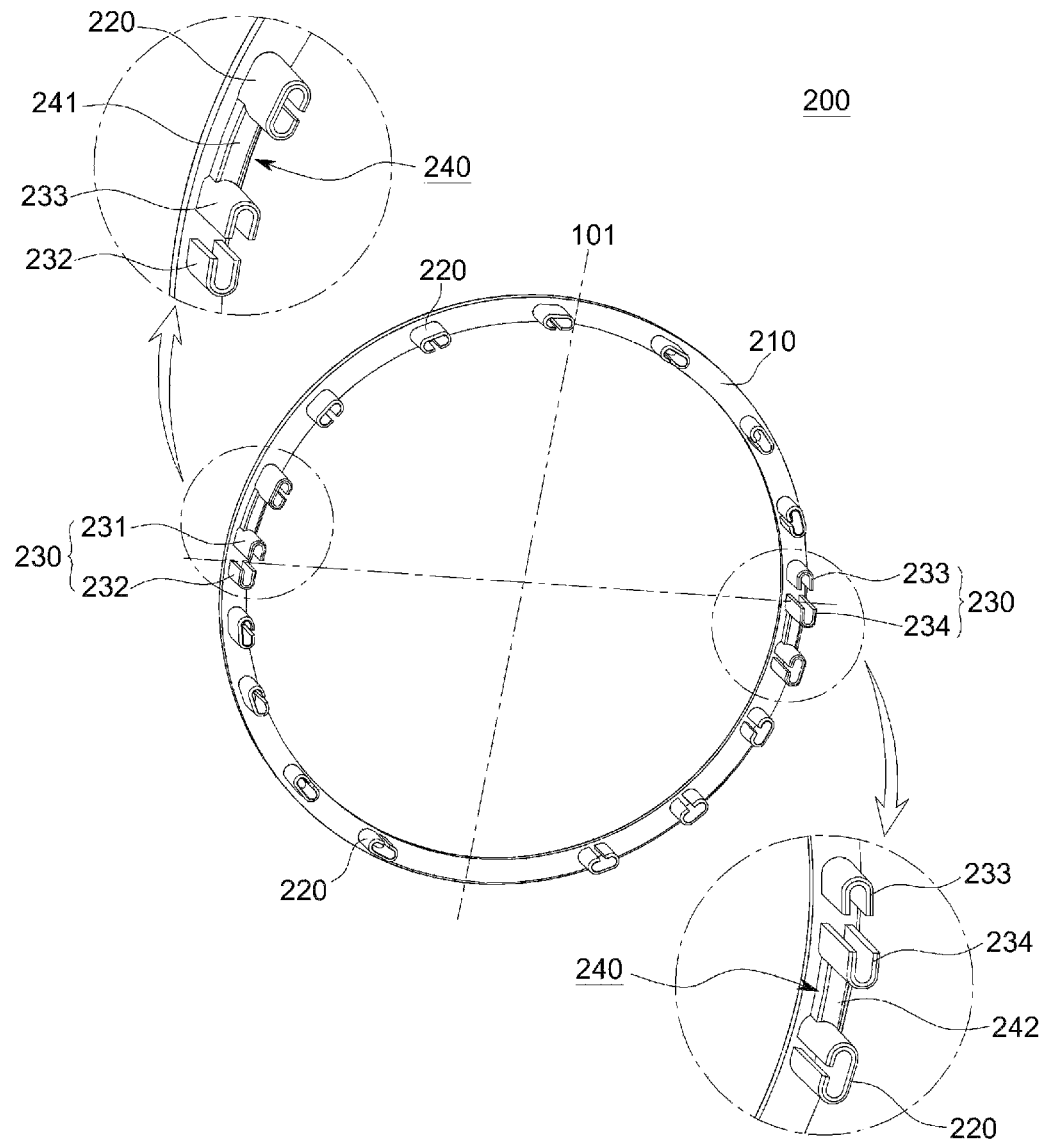
FIG. 6 is an exemplary view showing a bezel ring in the airbag cover for the vehicle according to an exemplary embodiment of the present invention.

FIG. 1 is an exemplary front view showing an airbag cover for a vehicle according to an exemplary embodiment of the present invention, FIG. 2 is an exemplary rear view of FIG. 1, FIG. 3 is an exemplary detailed view showing portions A and A' of FIG. 2, FIG. 4 is an exemplary front view showing an airbag cover body in the airbag cover for the vehicle according to the exemplary embodiment of the present invention, FIG. 5 is an exemplary rear view of FIG. 4, and FIG. 6 is an exemplary view showing a bezel ring in the airbag cover for the vehicle according to the exemplary embodiment of the present invention.

As shown in FIGS. 1 and 2, an airbag cover of the present invention may include an airbag cover body 100 having a tear line 110 to allow the body 100 to be torn off when an airbag cushion (not shown) is deployed, and a bezel ring 200 coupled to the airbag cover body 100 and having a ring shape. The airbag cover body 100 may be coupled to an airbag housing to cover the airbag cushion disposed in the airbag housing in a folded state. The bezel ring 200 may be secured to the airbag cover body 100 via thermal bonding to be spaced apart from an emblem 102, thus providing a decorative effect.

As shown in FIG. 2, the tear line 110 may be formed on an inner surface of the airbag cover body 100 that may be torn off when the airbag cushion is deployed. The tear line 110 may include a pair of first tear lines 111 disposed in a longitudinal direction of the airbag cover body 100 to be spaced apart from each other, and a pair of second tear lines 112 disposed in a transverse direction to connect the pair of first tear lines 111 to each other. Thus, during the deployment of the airbag cushion, cover plates disposed on opposite sides of the second tear lines 112 may be respectively tilted upwards and downwards, thus allowing the airbag cushion (not shown) to be deployed.

Moreover, a plurality of insertion apertures 120 may be formed in the airbag cover body 100 to be spaced apart from each other in, for example, an approximate circular shape, and thus corresponding to a shape of the bezel ring 200.

In the present embodiment, as shown in FIGS. 1 to 3, the bezel ring 200 may include a bezel ring body 210, and a plurality of protrusions 220 that protrude from a surface of the bezel ring body 210 and are inserted into the plurality of insertion apertures 120. In particular, by thermally bonding an end of each protrusion 220 using a separate thermal bonding machine when a plurality of protrusions 220 are inserted, respectively, into the insertion apertures 120, the bezel ring 200 may be secured to the airbag cover body 100. A specific portion the bezel ring body 210 may be broken to prevent both the cover plates from being tilted when the airbag cushion is deployed. Since, according to this embodiment, no tear line is formed on the bezel ring body 210, unlike in the related art, the bezel ring body 210 may be formed to have a constant thickness in a circumferential direction thereof. More specifically, the bezel ring body 210 may have a constant thickness both in the circumferential directional and the radial direction thereof. Some of the protrusions 220 may be coupled to the tear line 110 formed on the airbag cover body 100, thus enabling the airbag cover body 100 to be broken when necessary. The characteristics of the above-mentioned embodiment will be described below.

As shown in FIGS. 2 and 3, when the bezel ring 200 is coupled to the airbag cover body 100, separating protrusions 230 of the protrusions 220 may be disposed in opposite directions with respect to the tear line 110, that is, the second tear line 112. As shown in FIG. 6, the separating protrusions 230 may include first and second separating protrusions 231 and 232 that may be disposed in the vicinity of each other, and third and fourth separating protrusions 233 and 234 that may be disposed in the vicinity of each other at a position facing the first and second separating protrusions 231 and 232. In particular, 'facing' may mean that the first and second separating protrusions 231 and 232 and the third and fourth separating protrusions 233 and 234 have a phase difference of about 180 degrees with respect to a center of the bezel ring 200, along the circumferential direction of the approximately circular bezel ring 200.

As shown in FIGS. 2 and 3, when the bezel ring 200 is coupled to the airbag cover body 100, the first to fourth separating protrusions 231, 232, 233 and 234 may be disposed, respectively, to be adjacent to the second tear line 112. In addition, the second tear line 112 may be a groove that has a V-shaped cross-section. Among the first to fourth separating protrusions 231, 232, 233 and 234, a distance between the first and second separating protrusions 231 and 232, which are adjacent to each other, and a distance between the third and fourth separating protrusions 233 and 234, which are adjacent to each other, may be substantially similar to a width between the top portions of the second tear lines 112. Additionally, as shown in FIG. 5, two pairs of separating-protrusion insertion apertures, that is, first to fourth separating-protrusion insertion apertures 131, 132, 133 and 134, may be formed within the airbag cover body 100 to allow the first to fourth separating protrusions 231, 232, 233 and 234 to be inserted therein. According to this embodiment, each of the first to fourth separating-protrusion insertion apertures 131, 132, 133 and 134 may be disposed adjacent to the second tear line 112.

In other words, according to the exemplary embodiment, when the bezel ring 200 is coupled to the airbag cover body 100, a distance between the second tear line 112 and each of the first to fourth separating protrusions 231, 232, 233 and 234 may be zero or approximately zero. Therefore, when the second tear line 112 is torn off by the deployment of the airbag cushion, a portion between the first and second separating protrusions 231 and 232, and a portion between the third and fourth separating protrusions 233 and 234 may be torn off. That is, as shown in FIG. 3, the portion between the first and second separating protrusions 231 and 232, and the portion between the third and fourth separating protrusions 233 and 234 may serve as breaking points.

When no separate tear line is disposed on the bezel ring 200, a distance from the second tear line 112 to each of the first to fourth separating protrusions 231, 232, 233 and 234 may be a predetermined value or greater and the bezel ring 200 may not be easily broken, thus hindering the airbag cushion from being deployed. Further, even though the bezel ring 200 is broken, the broken portion of the bezel ring 200 may not be disposed near a central region of the entire bezel ring 200. That is, since a part of the broken portion of the bezel ring 200 may further protrude laterally from a broken surface of both cover plates of the broken airbag cover body 100, the broker portion may remain on the deployed airbag cushion (not shown) or may inflict an injury to a driver.

According to the exemplary embodiment, as shown in FIGS. 2 and 3, the first to fourth separating-protrusion insertion apertures 131, 132, 133 and 134 may be disposed on both sides to be adjacent to the second tear line 112. When the bezel ring 200 is inserted into the airbag cover body 100, the first to fourth separating protrusions 231, 232, 233 and 234 may be adjacent to the second tear line 112 on opposite sides of the second tear line 112. In such a coupled state, by the deployment pressure of the airbag cushion, among two pairs of the first to fourth separating protrusions 231, 232, 233 and 234, a portion between one pair of adjacent separating protrusions, that is, a portion between the first and second separating protrusions 231 and 232 or a portion between the third and fourth separating protrusions 233 and 234 may be subjected to a predetermined shear load, causing the portion between the first and second separating protrusions 231 and 232 or the portion between the third and fourth separating protrusions 233 and 234 to break.

According to the exemplary embodiment, as shown in FIGS. 4 to 6, to perform the above-mentioned breaking operation more easily, each of the first to fourth separating protrusions 231, 232, 233 and 234 and each of the first to fourth separating-protrusion insertion apertures 131, 132, 133 and 134 may have a semi-circular or a semi-elliptical shape. In addition, when a predetermined shear load is exerted on the first to fourth separating protrusions 231, 232, 233 and 234 when each of the first to fourth separating protrusions 231, 232, 233 and 234 has a cross-section of a closed curve, such as a circle or an ellipse, such a shear load may not be concentrated between the first and second separating protrusions 231 and 232 and between the third and fourth separating protrusions 233 and 234, due to the shape of the cross-section of the closed curve.

In contrast, when each of the first to fourth separating protrusions 231, 232, 233 and 234 and each of the first to fourth separating-protrusion insertion apertures 131, 132, 133 and 134 have a semi-circular or a semi-elliptical shape, a predetermined shear load exerted on the first to fourth separating protrusions 231, 232, 233 and 234 during the deployment of the airbag may be concentrated between the first and second separating protrusions 231 and 232 and between the third and fourth separating protrusions 233 and 234, thus easing the breaking of the tear line. In other words, when no separate tear line is formed on the bezel ring body 210, unlike in the related art, the bezel ring body 210 may be easily broken during the deployment of the airbag cushion.

Moreover, when the airbag cushion is deployed, to prevent the broken portion of the bezel ring body 210 from protruding further from both cover plates of the broken airbag cover body 100, the breaking operation may occur at a substantially central region between the first and second separating protrusions 231 and 232 and at a substantially central region between the third and fourth separating protrusions 233 and 234, respectively.

In particular, as shown in FIGS. 4 to 6, a guide pin 240 having a predetermined thickness may protrude from a surface of the bezel ring 200 on which a plurality of protrusions 220 may be formed, and a guide-pin insertion slot 140 may be formed within the airbag cover body 100 to allow the guide pin 240 to be inserted therein. Specifically, the guide pin 240 may provide a relative thickness difference for the bezel ring 200, thus allowing shear stress to be more efficiently concentrated between the first and second separating protrusions 231 and 232, and between the third and fourth separating protrusions 233 and 234, as will be described below. Further, when a spacing interval between the remaining protrusions, not including the first to fourth separating protrusions 231, 232, 233 and 234, is not constant or a symmetrical structure is not provided in a horizontal or vertical direction, the guide pin 240 may be used for forward insertion to prevent assembly error. Hereinafter, the case wherein the guide pin 240 is used to concentrate the above-mentioned shear stress will be described in detail.

According to this embodiment, two guide pins 240 and two guide-pin insertion slots 140 may be provided, respectively. Further, the two guide-pin insertion slots 140 may be formed to communicate with some of the first to fourth separating-protrusion insertion apertures 131, 132, 133 and 134, and may have an asymmetric structure in the horizontal direction with respect to a longitudinal central line 101 of the airbag cover body 100, as shown in FIGS. 4 and 6.

In addition, as shown in FIG. 6, the two guide pins 240 may include a first guide pin 241 that connects one of the first and second separating protrusions 231 and 232 located at a relatively upper position, that is, the first separating protrusion, to a protrusion that is the nearest to the first separating protrusion 231 above it, and a second guide pin 242 that connects one of the third and fourth separating protrusions 233 and 234 located at a substantially lower position, that is, the fourth separating protrusion, to a protrusion that is the nearest to the fourth separating protrusion 234 below it.

Similarly, as shown in FIG. 4, the two guide-pin insertion slots 140 may include a first guide-pin insertion slot 141 and a second guide-pin insertion slot 142. The first guide-pin insertion slot 141 may connect the second separating-protrusion insertion aperture 132 to the insertion aperture that is the nearest to the second separating-protrusion insertion aperture 132 below it. The second guide-pin insertion slot 142 may connect the third separating-protrusion insertion aperture 133 to the insertion aperture that is nearest to the third separating-protrusion insertion hole 133 above it.

In other words, when the bezel ring 200 is coupled to the airbag cover body 100, the first and second separating protrusions 231 and 232 may be inserted, respectively, into the third and fourth separating-protrusion insertion apertures 133 and 134, and the third and fourth separating protrusions 233 and 234 may be inserted, respectively, into the first and second separating-protrusion insertion apertures 131 and 132, and the first guide pin 241 may be inserted into the second guide-pin insertion slot 142, and the second guide pin 242 may be inserted into the first guide-pin insertion slot 141.

In the exemplary embodiment, as shown in FIGS. 4 to 6, the first and second guide-pin insertion slots 141 and 142 may be asymmetric in the horizontal direction with respect to the longitudinal central line 10 of the airbag cover body 100, and may be formed on opposite sides of the second tear line 112, and the first and second guide pins 241 and 242 may be inserted into the first and second guide-pin insertion slots 141 and 142, respectively. Thus, shear stress generated by the deployment of the airbag cushion may be more efficiently concentrated on a substantially central region between the first and second separating protrusions 231 and 232, and on a substantially central region between the third and fourth separating protrusions 233 and 234. In addition, a thickness difference of the bezel ring may cause the shear stress to be concentrated on the above-mentioned portion. Therefore, when the airbag cushion is deployed, both separate bodies of the bezel ring 200 may have a substantially similar shape.

Moreover, due to the shape of the first and second guide-pin insertion slots 141 and 142, as shown in FIG. 5, protruding portions may be disposed, respectively, at portions corresponding to the first and second guide-pin insertion slots 141 and 142 on a back of the airbag cover body 100. In the exemplary embodiment, the first and third separating protrusions 231 and 233 and two protrusions disposed in the vicinity thereof may be inserted into apertures formed in the protruding portions. In addition, to ensure a fix operation via thermal bonding, the first and third separating protrusions 231 and 233 and the two protrusions disposed in the vicinity thereof may be longer (e.g., greater in length) than the remaining protrusions.

In other words, the exemplary embodiment provides a coupling structure of the bezel ring 200 with the airbag cover body 100, and more specifically, provides the first to fourth separating protrusions 231, 232, 233 and 234 adjacent to the second tear line 112, thus allowing the bezel ring 200 and the airbag cover body 100 to be easily broken when the airbag cushion is deployed, without the necessity of forming a separate tear line on the bezel ring 200.

Further, the separate tear line may not be formed on the bezel ring 200, thus reducing the breakage of the bezel ring 200, regardless of a driver intention, even when the driver repeatedly pushes the upper surface of the airbag cover body 100 to perform a horn function. In addition, the exemplary embodiment may enhance the durability of the bezel ring 200 when a driver performs the horn function repeatedly over time.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An airbag cover for a vehicle including:
    an airbag cover body having a tear line to allow the airbag cover body to be torn off when an airbag cushion is deployed; and
    a bezel ring coupled to the airbag cover body, with a plurality of insertion apertures formed within the airbag cover body to allow a plurality of protrusions of the bezel ring to be inserted therein, wherein the airbag cover includes:
        two guide pins that protrude from a surface of a body of the bezel ring; and
    two guide-pin insertion slots formed within the airbag cover body to allow the guide pins to be inserted therein, wherein the two guide pins include:
        a first guide pin that connects a first or second separating protrusion disposed at a relatively upper position to a protrusion disposed above an associated first or second separating protrusion to be spaced apart therefrom; and
        a second guide pin that connects a third or fourth separating protrusion disposed at a relatively lower position to a protrusion disposed below an associated third or fourth separating protrusion to be spaced apart therefrom.

2. The airbag cover as set forth in claim 1, wherein the bezel ring body comprises:
    first and second separating protrusions spaced apart from each other and adjacent in a circumferential direction of the bezel ring body, and third and fourth separating protrusions adjacent to each other at a position facing the first and second separating protrusions.

3. The airbag cover as set forth in claim 2, wherein the airbag cover body comprises:
    first to fourth separating protrusion insertion apertures to allow the first to fourth separating protrusions to be inserted therein.

4. The airbag cover as set forth in claim 1, wherein the guide pin insertion slot comprises:
    a plurality of guide pin insertion slots formed to communicate with first to fourth separating protrusion insertion apertures, and having an asymmetric structure in a horizontal direction with respect to a longitudinal central line of the airbag cover body.

* * * * *